(12) United States Patent
Martin et al.

(10) Patent No.: US 10,949,359 B2
(45) Date of Patent: Mar. 16, 2021

(54) OPTIMIZING CACHE PERFORMANCE WITH PROBABILISTIC MODEL

(71) Applicant: EMC IP Holding Company LLC, Hopkinton, MA (US)

(72) Inventors: Owen Martin, Hopedale, MA (US); Kaustubh S. Sahasrabudhe, Westborough, MA (US); Mark D. Moreau, Grafton, MA (US); Malak Alshawabkeh, Franklin, MA (US); Earl Medeiros, Fall River, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1 day.

(21) Appl. No.: 15/961,402

(22) Filed: Apr. 24, 2018

(65) Prior Publication Data

US 2019/0324921 A1  Oct. 24, 2019

(51) Int. Cl.
*G06F 12/122* (2016.01)
*G06F 12/0815* (2016.01)

(52) U.S. Cl.
CPC ........ *G06F 12/122* (2013.01); *G06F 12/0815* (2013.01); *G06F 2212/1021* (2013.01); *G06F 2212/608* (2013.01)

(58) Field of Classification Search
CPC .................................................... G06F 12/122
USPC ......................................................... 711/136
See application file for complete search history.

(56) References Cited

U.S. PATENT DOCUMENTS

| | | | |
|---|---|---|---|
| 7,536,510 B1* | 5/2009 | Thompson | G06F 12/0864 711/119 |
| 2004/0143706 A1* | 7/2004 | Johns | G06F 12/123 711/128 |

* cited by examiner

*Primary Examiner* — Jae U Yu
(74) *Attorney, Agent, or Firm* — Muirhead and Saturnelli, LLC

(57) ABSTRACT

Determining storage of particular data in cache memory of a storage device includes using a first mechanism to determine when to remove the particular data from the cache memory and using a second mechanism, independent from the first mechanism, to inhibit the particular data from being stored in the cache memory independent of whether the first mechanism otherwise causes the particular data to be stored in the cache memory. The first mechanism may remove data from the cache memory that was least recently accessed. The second mechanism may be based, at least in part, on a prediction value of an expected benefit of storing the particular data in the cache memory. The prediction value may be determined based on input data corresponding to measured cache read hits (RH), cache write hits (WH), cache read misses (RM), cache write destage operations (WD), and prefetch reads (PR) for the particular data.

16 Claims, 4 Drawing Sheets

OPTIMIZING CACHE PERFORMANCE WITH PROBABILISTIC MODEL

TECHNICAL FIELD

This application relates to the field of computer systems and storage devices therefor and, more particularly, to the field of optimizing use of internal cache in storage devices.

BACKGROUND OF THE INVENTION

Host processor systems may store and retrieve data using a storage device containing a plurality of host interface units (I/O modules), disk drives, and disk interface units (disk adapters). The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to any one of the actual disk drives. Allowing multiple host systems to access the single storage device unit allows the host systems to share data stored therein.

Performance of the storage device may be improved by using a cache memory, which is a relatively fast memory that is often volatile and often relatively more expensive. The cache memory temporarily stores data that is being accessed. Thus, for example, a block of data that is read by a host may initially be fetched from a disk drive and stored in the cache memory. Subsequent reads by a host system may then access the data in the cache memory so that it is not necessary to fetch the data from a disk drive after the initial fetch. Data that has been stored in the cache memory may be subsequently removed to make room for more recently accessed data.

A ratio of a number of times accessed data is in the cache memory (cache hit) to a number of times accessed data needs to be fetched from (or written to) non-volatile memory (cache miss) is called the cache hit rate. Since accessing data from the cache rather than from non-volatile memory is more efficient, it is desirable to increase the cache hit rate. One possibility is to increase the size of the cache memory and to decrease instances of data being removed therefrom. However, empirical analysis of cache behavior shows that the cache hit rate does not improve proportionally to the cache size. As more cache memory is added, the cache hit rate eventually reaches a plateau where the additional cache memory fails to produce any appreciable benefit.

Accordingly, it is desirable to increase efficiency (hit rate) of cache memory usage beyond any increase in hit rate values provided by increasing the cache memory size.

SUMMARY OF THE INVENTION

According to the system described herein, determining storage of particular data in cache memory of a storage device includes using a first mechanism to determine when to remove the particular data from the cache memory and using a second mechanism, independent from the first mechanism, to inhibit the particular data from being stored in the cache memory independent of whether the first mechanism otherwise causes the particular data to be stored in the cache memory. The first mechanism may remove data from the cache memory that was least recently accessed. The second mechanism may be based, at least in part, on a prediction value of an expected benefit of storing the particular data in the cache memory. The prediction value may be determined based on input data corresponding to measured cache read hits (RH), cache write hits (WH), cache read misses (RM), cache write destage operations (WD), and prefetch reads (PR) for the particular data. The prediction value may be determined based on a formula:

$$\text{prediction value} = (RH+WH)/(RM+WD+PR) + \text{RandomValue}$$

where the RandomValue is a value between zero and one. The input data for RH, WH, RM, WD, and PR may be aged to cause more recent data to have a greater influence on the prediction value than less recent data. Aging the input data may include using a short term average that halves values of the input data once every twenty-hours and a long term average that halves values of the input data once every five days. A prediction value of greater than one may cause the second mechanism to always allow the particular data to be stored in the cache memory. Determining storage of particular data in cache memory of a storage device may also include generating a random number between zero and one and allowing the particular data to be stored in the cache memory in response to the random number being less than the prediction value. The prediction value may be stored in a hash table that is accessed where data is being stored in the cache memory.

According further to the system described herein, a non-transitory computer-readable medium contains software that determines storage of particular data in cache memory of a storage device. The software includes executable code that uses a first mechanism to determine when to remove the particular data from the cache memory and executable code that uses a second mechanism, independent from the first mechanism, to inhibit the particular data from being stored in the cache memory independent of whether the first mechanism otherwise causes the particular data to be stored in the cache memory.

The first mechanism may remove data from the cache memory that was least recently accessed. The second mechanism may be based, at least in part, on a prediction value of an expected benefit of storing the particular data in the cache memory. The prediction value may be determined based on input data corresponding to measured cache read hits (RH), cache write hits (WH), cache read misses (RM), cache write destage operations (WD), and prefetch reads (PR) for the particular data. The prediction value may be determined based on a formula:

$$\text{prediction value} = (RH+WH)/(RM+WD+PR) + \text{RandomValue}$$

where the RandomValue is a value between zero and one. The input data for RH, WH, RM, WD, and PR may be aged to cause more recent data to have a greater influence on the prediction value than less recent data. Aging the input data may include using a short term average that halves values of the input data once every twenty-hours and a long term average that halves values of the input data once every five days. A prediction value of greater than one may cause the second mechanism to always allow the particular data to be stored in the cache memory. The software may also include executable code that generates a random number between zero and one and executable code that allows the particular data to be stored in the cache memory in response to the random number being less than the prediction value. The prediction value may be stored in a hash table that is accessed where data is being stored in the cache memory.

BRIEF DESCRIPTION OF THE DRAWINGS

Embodiments of the system are described with reference to the several figures of the drawings, noted as follows.

DETAILED DESCRIPTION OF VARIOUS EMBODIMENTS

The system described herein uses a probabilistic model to predict whether storing particular data in cache memory will be to improve cache hit rate. For each extent of a data storage system, the average of past cache hit rate values is used to predict cache hit rate values going forward. For extents having a relatively low predicted future cache hit rate, a probability of receiving a benefit of placing corresponding data into cache is determined and, based on the probability, data is selectively prevented from being stored in the cache memory.

Figure 1:
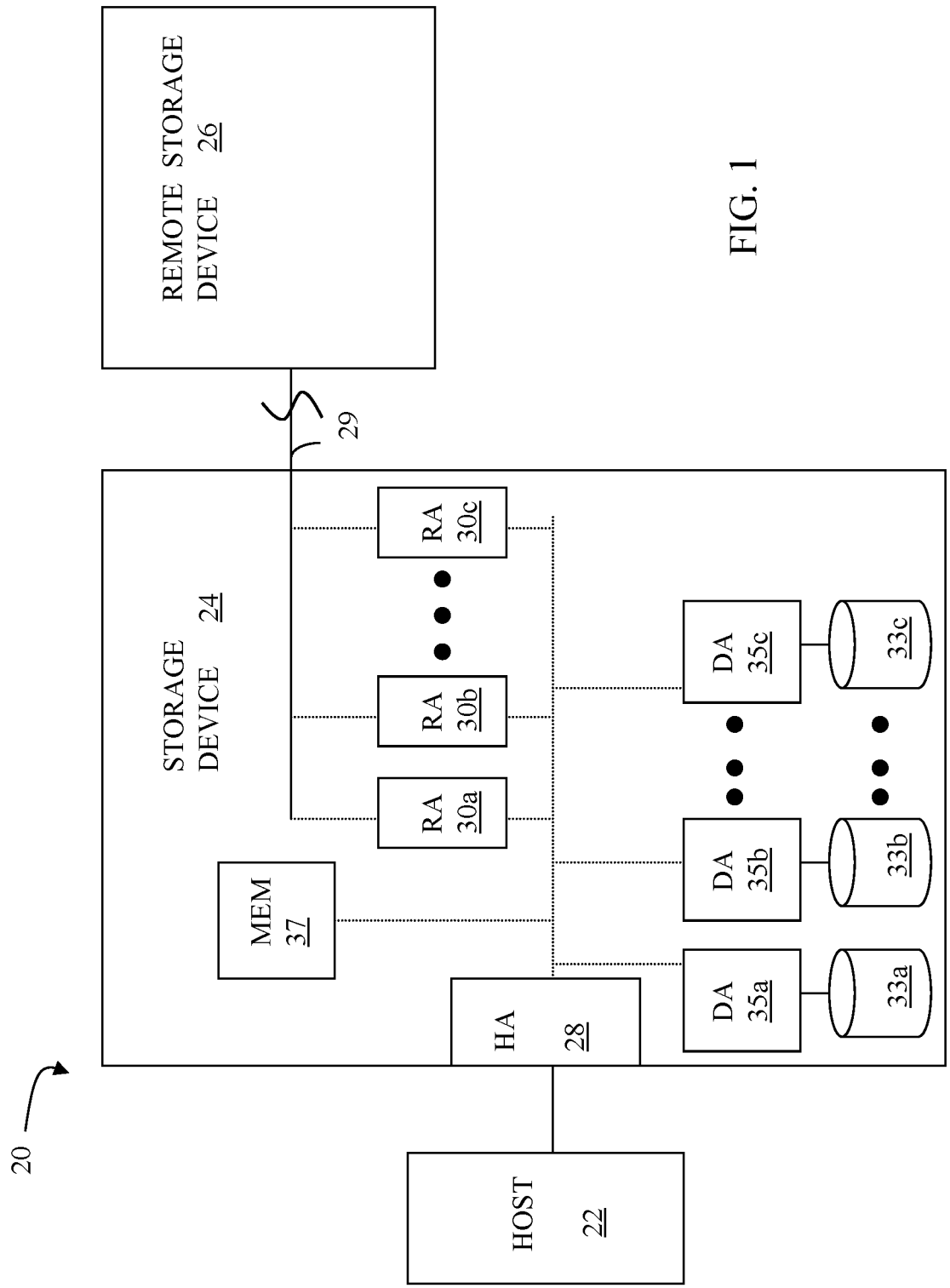
FIG. 1 is a schematic illustration of a storage system showing a relationship between a host and a storage device that may be used in connection with an embodiment of the system described herein.

FIG. 1 is a schematic illustration of a storage system 20 showing a relationship between a host 22 and a storage device 24 that may be used in connection with an embodiment of the system described herein. In an embodiment, the storage device 24 may be a Symmetrix or VMAX storage system produced by Dell EMC of Hopkinton, Mass.; however, the system described herein may operate with other appropriate types of storage devices. Also illustrated is another (remote) storage device 26 that may be similar to, or different from, the storage device 24 and may, in various embodiments, be coupled to the storage device 24, for example, via a network. The host 22 reads and writes data from and to the storage device 24 via an HA 28 (host adapter), which facilitates an interface between the host 22 and the storage device 24. Although the diagram 20 only shows one host 22 and one HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage device 24 may be copied to the remote storage device 26 via a link 29. For example, the transfer of data may be part of a data mirroring or replication process that causes data on the remote storage device 26 to be identical to the data on the storage device 24. Although only the one link 29 is shown, it is possible to have additional links between the storage devices 24, 26 and to have links between one or both of the storage devices 24, 26 and other storage devices (not shown). The storage device 24 may include a first plurality of remote adapter units (RA's) 30a, 30b, 30c. The RA's 30a-30c may be coupled to the link 29 and be similar to the HA 28, but are used to transfer data between the storage devices 24, 26.

The storage device 24 may include one or more disks (including solid state units and/or other types of storage units), each containing a different portion of data stored on each of the storage device 24. FIG. 1 shows the storage device 24 having a plurality of disks 33a, 33b, 33c. The storage device (and/or remote storage device 26) may be provided as a stand-alone device coupled to the host 22 as shown in FIG. 1 or, alternatively, the storage device 24 (and/or remote storage device 26) may be part of a storage area network (SAN) that includes a plurality of other storage devices as well as routers, network connections, etc. (not shown). The storage devices may be coupled to a SAN fabric and/or be part of a SAN fabric. The system described herein may be implemented using software, hardware, and/or a combination of software and hardware where software may be stored in a computer readable medium and executed by one or more processors.

Each of the disks 33a-33c may be coupled to a corresponding disk adapter unit (DA) 35a, 35b, 35c that provides data to a corresponding one of the disks 33a-33c and receives data from a corresponding one of the disks 33a-33c. An internal data path exists between the DA's 35a-35c, the HA 28 and the RA's 30a-30c of the storage device 24. Note that, in other embodiments, it is possible for more than one disk to be serviced by a DA and that it is possible for more than one DA to service a particular disk. The storage device 24 may also include a global memory 37 that may be used to facilitate data transferred between the DA's 35a-35c, the HA 28 and the RA's 30a-30c. The memory 37 may contain tasks that are to be performed by one or more of the DA's 35a-35c, the HA 28 and/or the RA's 30a-30c, and may contain a cache for data fetched from one or more of the disks 33a-33c.

The storage space in the storage device 24 that corresponds to the disks 33a-33c may be subdivided into a plurality of volumes or logical devices. The logical devices may or may not correspond to the physical storage space of the disks 33a-33c. Thus, for example, the disk 33a may contain a plurality of logical devices or, alternatively, a single logical device could span both of the disks 33a, 33b. Similarly, the storage space for the remote storage device 26 may be subdivided into a plurality of volumes or logical devices, where each of the logical devices may or may not correspond to one or more disks of the remote storage device 26.

Figure 2:
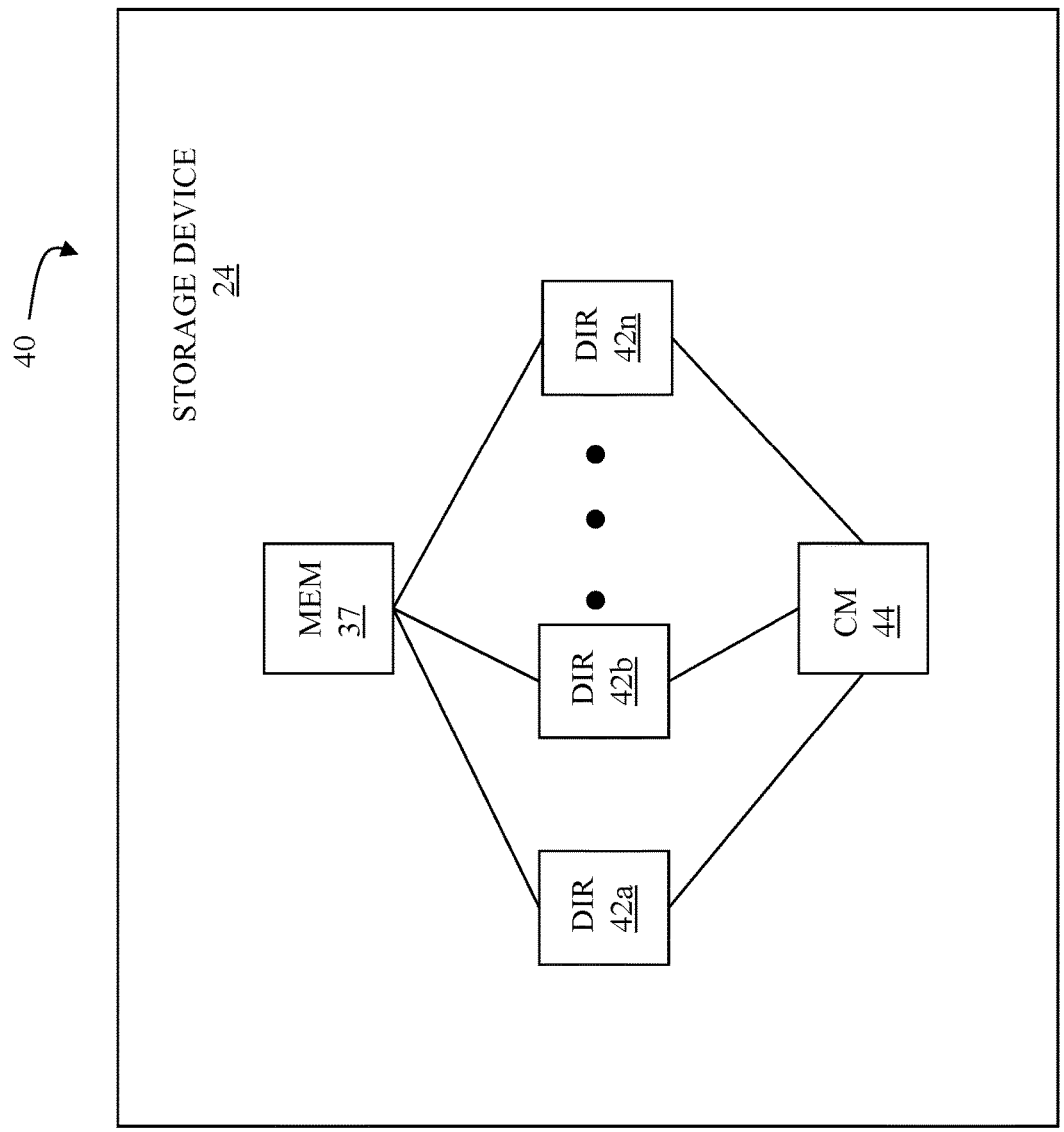
FIG. 2 is a schematic diagram illustrating an embodiment of the storage device where each of a plurality of directors are coupled to the memory that may be used in connection with an embodiment of the system described herein.

FIG. 2 is a schematic diagram 40 illustrating an embodiment of the storage device 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 26. The CM 44 may be implemented using conventional MUX/router technology where a sending one of the directors 42a-42n provides an appropriate address to cause a message and/or data to be received by an intended receiving one of the directors 42a-42n. Some or all of the functionality of the CM 44 may be implemented using one or more of the directors 42a-42n so that, for example, the directors 42a-42n may be interconnected directly with the interconnection functionality being provided on each of the directors 42a-42n. In addition, a sending one of the directors 42a-42n may be able to broadcast a message to all of the other directors 42a-42n at the same time.

In some embodiments, one or more of the directors 42a-42n may have multiple processor systems thereon and thus may be able to perform functions for multiple directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage device 24 may be provided as one or more director boards having CPUs, memory (e.g., DRAM, etc.) and interfaces with Input/Output (I/O) modules.

Figure 3:
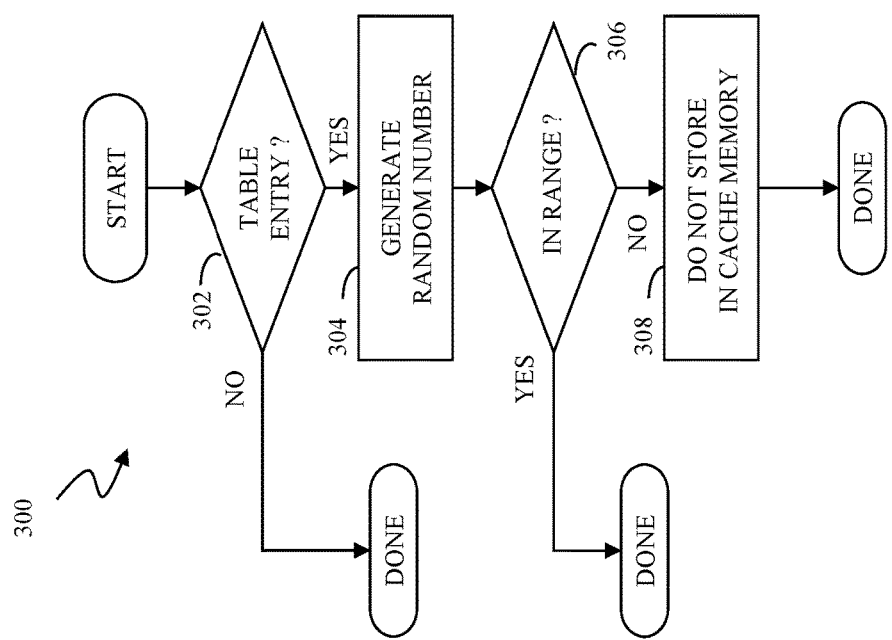
FIG. 3 is a flow diagram illustrating processing performed in connection with determining whether to store data in cache memory according to an embodiment of the system described herein.

Referring to FIG. 3, a flow diagram 300 illustrates processing provided at the storage device 24 in connection with determining whether data that is being fetched is to be stored in cache memory (i.e., part of the memory 37) of the storage device 24. The determination is based on a predicted likelihood (Bayesian value) of the data being accessed while in cache (i.e., a measure of an expected benefit of having the data stored in cache memory), as described in more detail elsewhere herein. The processing illustrated by the flow diagram 300 may be performed in addition to and possibly independent of other cache processing that determines which data is removed (destaged) from the cache memory. For example, if a Least Recently Used (LRU) mechanism is used to determine which data is removed from the cache memory, then when room is needed in the cache memory for more data, a cache slot that was least recently accessed by the system is removed from the cache memory. The processing illustrated by the flow diagram 300 provides an additional and possibly independent mechanism (i.e., in addition to and independent from the LRU mechanism) for inhibiting data being placed in the cache memory. That is, the processing illustrated by the flow diagram 300 may prevent data from being placed in the cache memory at all even though the data would have been otherwise stored in the cache memory. Thus, for example, data that is read from the non-volatile memory (e.g., one of the disks 33a-33c) that would otherwise be placed in the cache memory is not placed in the cache memory based on a determination by the processing illustrated by the flow diagram 300. Note that, in other embodiments, the system described herein may be adapted to either reduce or increase an amount of time data spends in cache memory (i.e., increase or decrease with respect to whatever algorithm is otherwise used to otherwise determine how long data is maintained in cache).

In an embodiment herein, data for the storage device 24 is grouped together in extents of 1764 tracks, where each track is 128 kb of data and each cache slot is one track. The tracks may be logically contiguous. The determination of whether particular data should be stored in cache memory is based on the particular extent in which the data resides. That is, the determination of whether to maintain data X (track X) that is part of extent Y in cache memory depends upon whether extent Y has been selected to possibly not be stored in the cache memory. The mechanism for the determination is described in more detail elsewhere herein. Of course, other extent sizes are possible. Choosing a particular size of an extent is a tradeoff between an amount of time needed to make the determination described herein for all of the extents of the entire storage device 24 and accuracy and homogeneity of the determination throughout data of an entire extent. If an extent size is too small, then the number of calculations could be too large because of the relatively large number of extents in the storage device 24. On the other hand, if the extent size is too large, then the determination of whether particular data should be stored in cache memory may not be applicable (or useful) for the entire extent (i.e., one part of the large extent should be stored in the cache memory while another part of the large extent should not be stored in the cache memory).

Processing begins at a first test step 302 where it is determined if there is a table entry corresponding to an extent of particular data being processed. In an embodiment herein, a hash table is used to indicate specific extents having data that is not be stored in the cache memory in each instance after being fetched because the predicted likelihood of the data being accessed while in cache is relatively low. The hash table may be implemented using an ordered linked list or a tree having node values that correspond to hash values that represent unique extents. Generation of the hash table and values therefor is described in more detail elsewhere herein. Testing an extent at the step 302 may include obtaining a hash value by hashing a unique identifier corresponding to a particular extent, such as an extent number, and then traversing the hash table to find a match to the hash value. If it is determined at the step 302 that there is no entry in the table corresponding to the extent of the data being examined, then processing is complete and regular cache memory management processing is performed so that the data is maintained in the cache memory using a cache memory algorithm, such as LRU, without regard to the processing illustrated by the flow diagram 300.

If it is determined at the test step 302 that there is a table entry corresponding to an extent of particular data being processed, then control transfers from the test step 302 to a step 304 where a random number between zero and one is generated. In an embodiment herein, each entry in the hash table includes a prediction value between zero and one that corresponds to a predicted likelihood that placing data from a corresponding extent into the cache memory will be useful (i.e., that the data will be accessed while being stored in the cache memory). Determination of the prediction value is described in more detail elsewhere herein. Following the step 304 is a test step 306 where the random number generated at the step 304 is compared with the prediction value of the hash table entry. In an embodiment herein, the prediction value corresponds to a predicted likelihood that placing data from a corresponding extent into the cache memory will be useful. Thus, for example, if the value of the hash table entry is 0.9, then the predicted likelihood that placing data from a corresponding extent into the cache memory will be beneficial is 90%.

If it is determined at the test step 306 that the random number generated at the step 304 is less than the prediction value of the hash table entry (i.e., the random number is in range), then processing is complete and regular cache memory management processing is performed. Otherwise, control transfers from the step 306 to a step 308 where the data is not stored in the cache memory. That is, processing at the step 308 causes data that would otherwise be stored in cache memory to not be stored in cache memory. The mechanism used at the step 308 may include, for example, setting a flag that causes cache memory processing to not move the data into the cache memory. Of course, any appropriate mechanism may be used. Following the step 308, processing is complete.

Figure 4:
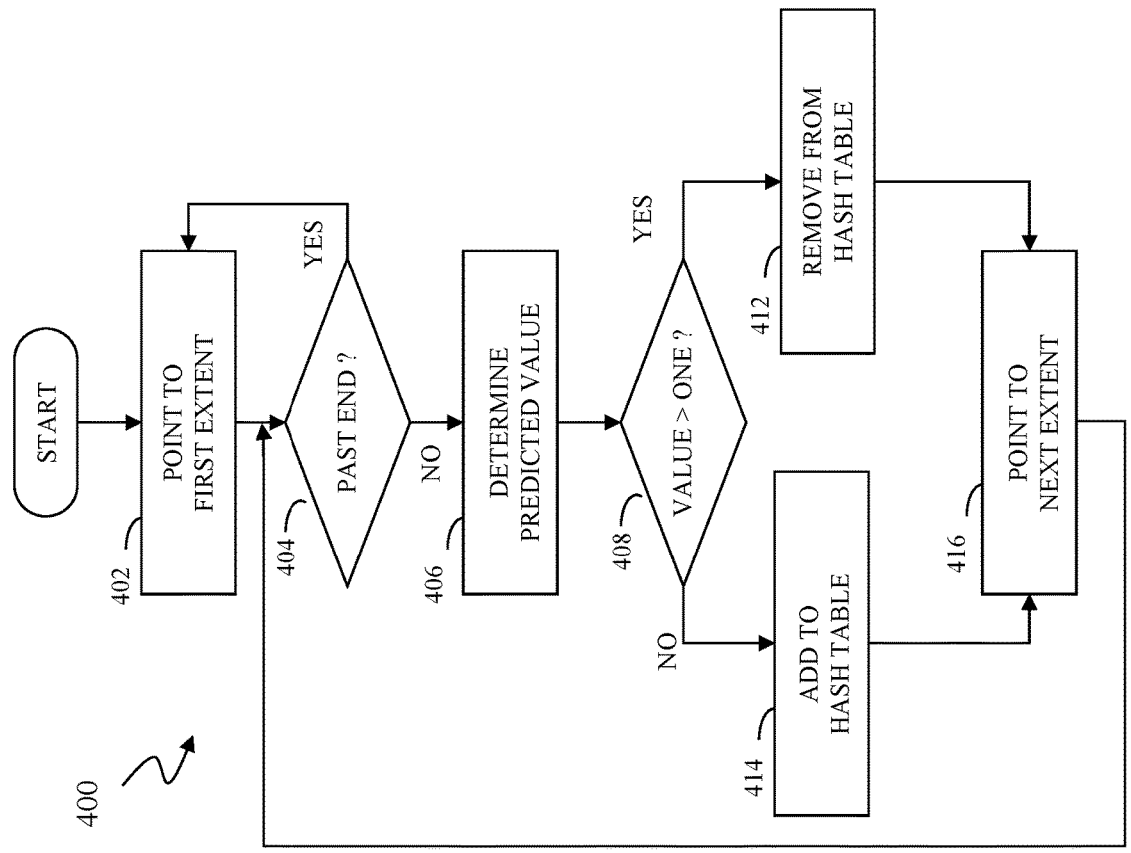
FIG. 4 is a flow diagram illustrating processing performed in connection with constructing a hash table for determining whether to place data in cache memory according to an embodiment of the system described herein.

Referring to FIG. 4, a flow diagram 400 illustrates constructing the hash table that contains prediction values that are used to determine whether to allow data to be stored in cache memory, as described in more detail elsewhere herein. Processing begins at a first step 402 where an iteration pointer, that iterates through all of the extents of the storage device 24, is set to point to a first one of the extents. Following the step 402 is a test step 404 where it is determined if the iteration pointer points past a last one of the extents (i.e., all of the extents have been processed). If so, then control transfers back to the step 402 to reset the iteration pointer and begin processing all of the extents of the storage device again. Otherwise, control transfers from the step 404 to a step 406 where the prediction value for the hash table is determined. Determining the prediction value for the hash table value is described in more detail elsewhere herein. Following the step 406 is a test step 408 where it is determined if the prediction value determined at the step 406 is greater than one (i.e., the prediction is that there is a greater than 100% chance that placing data from a corresponding extent into the cache memory will be beneficial). If so, then control transfers from the test step 408 to a step 412 where a corresponding entry in the hash table is removed. As discussed elsewhere herein, when there is no entry in the hash table for a particular extent, then all of the data for the extent is placed in and removed from cache memory according to regular cache memory processing (e.g., an LRU mechanism).

If it is determined at the test step 408 that the prediction value determined at the step 406 is not greater than one, then control transfers from the test step 408 to a step 414 where the prediction value and a hash of an identifier of the extent indicated by the iteration pointer is added to the hash table. Note that adding to the hash table at the step 414 can include overwriting a previous prediction value for the same extent that had been previously stored in the hash table. Following both of the steps 412, 414 is a step 416 where the iteration pointer is incremented to point to a next extent. Following the step 416, control transfers back to the step 404, discussed above, for a next iteration.

Figure 5:
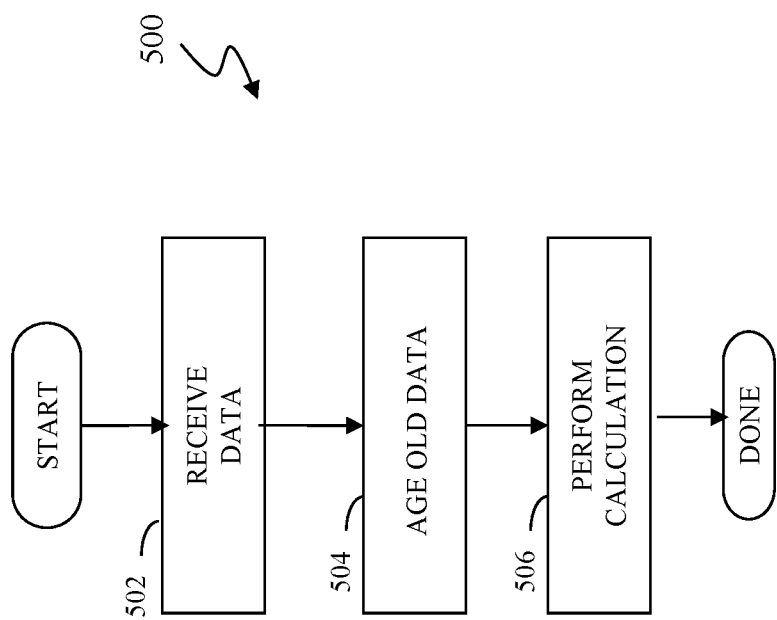
FIG. 5 is a flow diagram illustrating processing performed in connection with determining a prediction value of placing data in cache memory according to an embodiment of the system described herein.

Referring to FIG. 5, a flow diagram 500 illustrates in more detail determining a prediction value for an extent, discussed above in connection with the step 406. Processing begins at a first step 502 where data for an extent being analyzed is received. In an embodiment herein, the data includes a number of read hits (RH), where read hits occur when a read operation is performed and the data being read is already in the cache memory. The data also includes a number of write hits (WH) that occur when a write operation is performed and the corresponding data is already in the cache memory. The data also includes read misses (RM) for read operations to data that is not already in the cache memory and write destage operations (WD) when data is written from the cache memory to non-volatile memory (e.g., the disks 33a-33c). The data may also include prefetch reads (PR), which corresponding to anticipated reads based on prior read operations (e.g., sequential read of track 1, track 2, track 3, etc.) that cause data to be fetched from non-volatile memory (e.g., disks 33a-33c).

The prediction value may be based on a sliding average of the data where data is aged exponentially to reduce effects of data on the prediction value as the data becomes older. In an embodiment herein, there are two sliding averages, a short term sliding average and a long term sliding average. The short term sliding average halves the effect of old data each day (twenty-four hour period) so that, for example, data that is a day old has one half of the effect of current data, data that is two days old has one quarter of the effect of current data, etc. For the long term sliding average, the effect of old data is halved every five days. Following the step 502 is a step 504 where old data is aged according to the long term average and short term average. That is, after one day, a previous value of the short term average is halved and, after five days, a previous value of a long term average is halved. Thus, for each of RH, WH, RM, WD, and PR, there is an average value that is a combination of the short term average and the long term average. In an embodiment herein, the sample time for the data is less than one half of the cache fall through rate, which is the average amount of time that data remains in the cache memory. Of course, other sample rates are possible.

Following the step 504 is a step 506 where the prediction value is determined according to the formula:

$$\text{Prediction Value} = (RH+WH)/(RM+WD+PR) + \text{Random Value}$$

The Random Value may range from zero to one and can be adjustable during operation of the system. Note that, for example, the Random Value may be set to one or close to one while the system is initializing (before any data has been accumulated) and then may be decreased after the system has been operational for enough time to accumulate data. Note also that the Random Value allows data for an extent to always have an opportunity to be loaded into cache memory; without the Random Value, the Prediction Value could remain at zero after becoming zero since there would be no opportunities for read hits and write hits. Following the step 506, processing is complete.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of determining storage of particular data in cache memory of a storage device, comprising:
   using a first mechanism to determine when to remove the particular data from the cache memory; and
   using a second mechanism, independent from the first mechanism, to inhibit the particular data from being stored in the cache memory independent of whether the first mechanism otherwise causes the particular data to be stored in the cache memory, wherein the second mechanism is based, at least in part, on a prediction value of an expected benefit of storing the particular data in the cache memory and wherein the prediction value is determined based on input data corresponding to measured cache read hits (RH), cache write hits (WH), cache read misses (RM), cache write destage operations (WD), and prefetch reads (PR) for the particular data.

2. A method, according to claim 1, wherein the prediction value is determined based on a formula:

prediction value=$(RH+WH)/(RM+WD+PR)$+RandomValue wherein the RandomValue is a value between zero and one.

3. A method, according to claim 2, wherein the input data for RH, WH, RM, WD, and PR is aged to cause more recent data to have a greater influence on the prediction value than less recent data.

4. A method, according to claim 3, wherein aging the input data includes using a short term average that halves values of the input data once every twenty-hours and a long term average that halves values of the input data once every five days.

5. A method, according to claim 2, wherein a prediction value of greater than one causes the second mechanism to always allow the particular data to be stored in the cache memory.

6. A method, according to claim 2, further comprising:
   generating a random number between zero and one; and
   allowing the particular data to be stored in the cache memory in response to the random number being less than the prediction value.

7. A method, according to claim 2, wherein the prediction value is stored in a hash table that is accessed where data is being stored in the cache memory.

8. A method, according to claim 1, wherein the first mechanism removes data from the cache memory that was least recently accessed.

9. A non-transitory computer-readable medium containing software that determines storage of particular data in cache memory of a storage device, the software comprising:
   executable code that uses a first mechanism to determine when to remove the particular data from the cache memory; and
   executable code that uses a second mechanism, independent from the first mechanism, to inhibit the particular data from being stored in the cache memory independent of whether the first mechanism otherwise causes the particular data to be stored in the cache memory, wherein the second mechanism is based, at least in part, on a prediction value of an expected benefit of storing the particular data in the cache memory and wherein the prediction value is determined based on input data corresponding to measured cache read hits (RH), cache write hits (WH), cache read misses (RM), cache write destage operations (WD), and prefetch reads (PR) for the particular data.

10. A non-transitory computer-readable medium, according to claim 9, wherein the prediction value is determined based on a formula:

prediction value=$(RH+WH)/(RM+WD+PR)$+RandomValue wherein the RandomValue is a value between zero and one.

11. A non-transitory computer-readable medium, according to claim 10, wherein the input data for RH, WH, RM, WD, and PR is aged to cause more recent data to have a greater influence on the prediction value than less recent data.

12. A non-transitory computer-readable medium, according to claim 11, wherein aging the input data includes using a short term average that halves values of the input data once every twenty-hours and a long term average that halves values of the input data once every five days.

13. A non-transitory computer-readable medium, according to claim 10, wherein a prediction value of greater than one causes the second mechanism to always allow the particular data to be stored in the cache memory.

14. A non-transitory computer-readable medium, according to claim 10, further comprising:
    executable code that generates a random number between zero and one; and
    executable code that allows the particular data to be stored in the cache memory in response to the random number being less than the prediction value.

15. A non-transitory computer-readable medium, according to claim 10, wherein the prediction value is stored in a hash table that is accessed where data is being stored in the cache memory.

16. A non-transitory computer-readable medium, according to claim 9, wherein the first mechanism removes data from the cache memory that was least recently accessed.

* * * * *